May 8, 1951     F. T. CYPHER     2,552,408
VIOLIN BOW
Filed Dec. 20, 1949
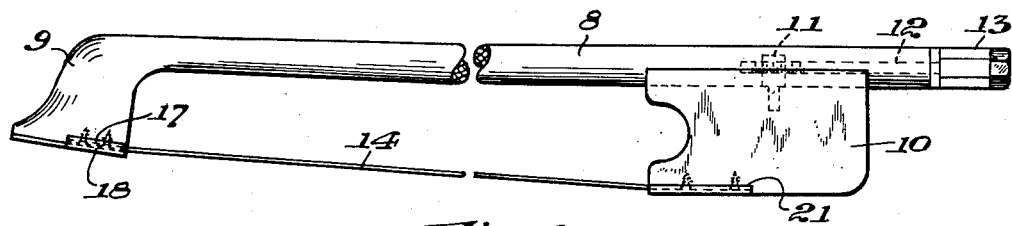
Fig. 1.
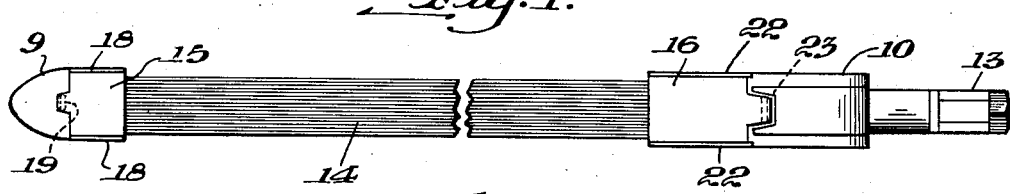
Fig. 2.
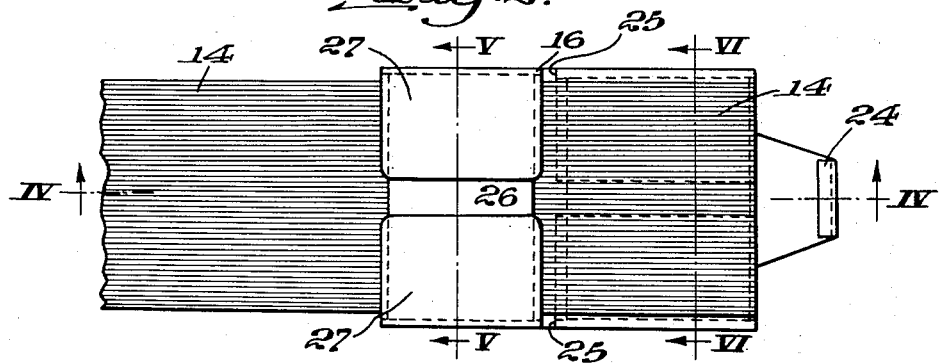
Fig. 8.     Fig. 3.
Fig. 4.
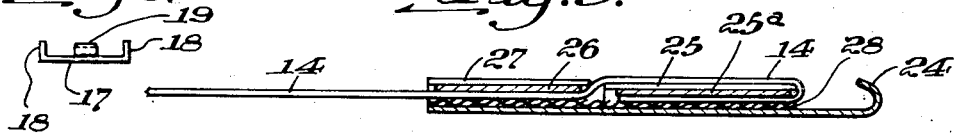
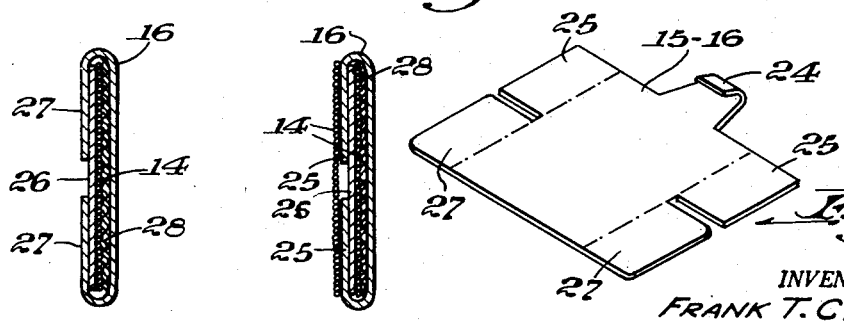
Fig. 5.     Fig. 6.     Fig. 7.
INVENTOR.
FRANK T. CYPHER.
BY Archworth Martin
his
ATTORNEY.

Patented May 8, 1951

2,552,408

UNITED STATES PATENT OFFICE 2,552,408

VIOLIN BOW

Frank Thomas Cypher, Butler, Pa.

Application December 20, 1949, Serial No. 133,987

3 Claims. (Cl. 84—282)

My invention relates to bows used for violins and the like, and more particularly to a means for securing the hairs or bow strings in unitary relation with respect to one another and connecting them to the head and frog of a bow.

One object of my invention is to provide a bow string arrangement wherein the hairs or strings at each end of the bow are secured together by clips that have detachable connection with the frog and head of the bow staff, the clips being of such form that but little change is required in the forms of standard frogs and heads for use with the clips therewith.

Another object of my invention is to provide a clip of such form that it will more effectively hold the hairs in symmetrically grouped arrangement than various types of clips heretofore employed for this purpose, and which, nevertheless, are of small bulk or overall thickness.

In the accompanying drawing, Fig. 1 is a side view of the bow equipped with my invention; Fig. 2 is a bottom view thereof; Fig. 3 is a view, on a greatly enlarged scale, of a portion of the bow spring arrangement of Fig. 2, at the upper face thereof; Figs. 4, 5 and 6 are views taken on the lines IV—IV, V—V and VI—VI respectively of Fig. 3; Fig. 7 is a perspective view of one of the clips of the other figures, and Fig. 8 is an end view of an attaching plate.

As shown in the drawing, a violin bow staff is indicated by the numeral 8, its head by the numeral 9 and its frog at 10. The frog has a threaded lug or nut 11 extending into a slot in the staff or rod 8. A screw threaded spindle 12 has threaded engagement with the nut 11 and is provided with a knob 13 by which it may be turned to adjust the tension on the bow strings in the usual manner. The parts thus far described may all be of conventional form, except for slight changes in the head 9 and the frog 10 to provide for conveniently effecting hooked engagement of the hair-holding clips therewith, as will be hereinafter described.

The hairs or strings 14 are secured in grouped unitary arrangement at each end by clips 15 and 16. These clips are formed of sheet metal blanks, one of which is shown in Fig. 7 and may suitably be of identical construction, except that it may be desirable to make the clip 16 of a little larger size than the clip 15. A plate 17 of generally channel form is secured to the head 9 by suitable screws and has flanges 18 at its longitudinal edges and a lip or flange 19 at its front end. The head is recessed so that the edges of the flanges 18 will be flush with the bottom plane of the head. The clip 15 will fit freely between the flanges 18 and have hooked engagement with the lip 19.

A plate 21 similar to the plate 17 is set into a recess in the frog 10 and held therein by suitable screws. The plate is provided with flanges 22 at its longitudinal edges between which the clip 16 will loosely fit, the plate having a lip or flange 23 at its rear end for hooked engagement by the clip 16.

The strings 14 may be of horse hair or other suitable material and are held in symmetrically-grouped arrangement at each end by the clips 15—16. As shown in Fig. 7, the clips are of sheet metal, each having a hook 24 formed thereon for detachable connection with the plates 17 and 21. Each clip has a pair of wings 25 that initially make clamped engagement with a plate 25a and the hairs 14, the hairs then being folded forwardly across the outer faces of these wings 25 and beneath clamping plate 26 that is held in gripping engagement with these strings by wings 27 that are folded over the plate. It will thus be seen that the hairs are securely clamped in symmetrical arrangement and approximately a common plane, without the use of clips having excessive thickness or bulk and which can therefore have their bottom planes coincident to the bottom planes of the head and the frog.

With a string unit thus formed, it will be seen that a violinist can have a stock of string units which he can readily apply as replacements to a bow, thus avoiding the necessity of being deprived of the use of his bow while replacement of hairs is being made at a repair shop.

Those portions of the clip surfaces which have direct engagement with the hairs preferably have adhesive tape secured thereto, as indicated at 28, to reduce danger of the hairs slipping in the clips.

I claim as my invention:

1. A fastening clip for bow strings, comprising a plate having a hook formed on one end, laterally-extending wings on the body of the clip, at points adjacent to the hook and bendable over a group of strings, and a second pair of laterally-extending wings near the other end of the plate, spaced longitudinally from the first-named wings and bendable over the strings when they have been folded back across the first-named wings and placed against the body of the plate.

2. A fastening clip for bow strings, comprising a plate having a hook formed on one end, laterally-extending wings on the body of the clip, at points adjacent to the hook, a clamping plate for holding hairs on the body of the clip at points between said wings, the wings being bendable over said plate to hold it in clamping position, a second pair of laterally-extending wings near the other end of the plate, and a clamping plate between the wings for holding the group of strings against the body of the plate, when the strings have been folded back against the first-named wings and against the body of the plate, the second pair of wings being bendable on the face of the second-named clamping plate to hold it in position.

3. A fastening clip for bow strings, comprising a plate having a hook formed on one end, laterally-extending wings on the body of the clip, at points adjacent to the hook and bendable over a group of strings, and a second pair of laterally-extending wings near the other end of the plate, spaced longitudinally from the first-named wings and bendable over the strings when they have been folded back across the first-named wings and placed against the body of the plate, and an adhesive tape disposed against the body of the plate in position to have adhesive connection also with the strings.

FRANK THOMAS CYPHER.

REFERENCES CITED

The following references are of record in the file of this patent:

UNITED STATES PATENTS

| Number | Name | Date |
| --- | --- | --- |
| 390,279 | Bohmann | Oct. 2, 1888 |
| 508,741 | Noble et al. | Nov. 14, 1893 |